(12) United States Patent
Beck (10) Patent No.: US 6,996,214 B1
(45) Date of Patent: Feb. 7, 2006

(54) UTILIZATION OF IN-BAND SIGNALING TO FACILITATE MODEM ON HOLD

(75) Inventor: Laurence A. Beck, Placentia, CA (US)

(73) Assignee: Silicon Laboratories, Inc., Austin, TX (US)

( * ) Notice: Subject to any disclaimer, the term of this patent is extended or adjusted under 35 U.S.C. 154(b) by 797 days.

(21) Appl. No.: 09/945,480

(22) Filed: Aug. 31, 2001

(51) Int. Cl.
*H04M 11/00* (2006.01)

(52) U.S. Cl. ............................... 379/93.35; 379/215.01

(58) Field of Classification Search ............ 379/93.01, 379/93.05, 93.06, 93.31–93.35, 142.07, 142.08, 379/142.15, 215.01; 375/220, 222; 370/252
See application file for complete search history.

(56) References Cited

U.S. PATENT DOCUMENTS

| | | | |
|---|---|---|---|
| 5,519,767 A * | 5/1996 | O'Horo et al. | 379/67.1 |
| 5,550,908 A * | 8/1996 | Cai et al. | 379/215.01 |
| 5,805,677 A * | 9/1998 | Ferry et al. | 279/93.35 |
| 6,104,800 A * | 8/2000 | Benson | 379/215.01 |
| 6,118,857 A * | 9/2000 | Terschluse | 379/93.35 |
| 6,317,488 B1 * | 11/2001 | DePond et al. | 379/93.35 |
| 6,731,726 B1 * | 5/2004 | Kerner et al. | 379/93.35 |
| 2004/0174967 A1 * | 9/2004 | Liang et al. | 379/93.35 |

FOREIGN PATENT DOCUMENTS

EP  741481 A2 * 11/1996

* cited by examiner

*Primary Examiner*—George Eng
(74) *Attorney, Agent, or Firm*—Farjami & Farjami LLP (57) ABSTRACT

A communication method and system for use by a local modem and a host, while the local modem is in communication with a remote modem through a central office. In one aspect, an alert signal is received by the local modem from the central office indicating an incoming call. In response, the local modem acknowledges the alter signal by sending a tone to the central office. Next, the local modem notifies the remote modem of a modem-on-hold state, the local modem collects caller identification received from the central office and informs the host of the call waiting event. Next, the local modem receives an in-band caller identification request from the host requesting the caller identification. In response, the local modem transmits the caller identification to the host using an in-band caller identification message. Next, the local modem receives an in-band answer request from the host to answer said incoming call.

20 Claims, 5 Drawing Sheets

UTILIZATION OF IN-BAND SIGNALING TO FACILITATE MODEM ON HOLD

BACKGROUND OF THE INVENTION

1. Field of the Invention

The present invention relates generally to modem on hold. More particularly, the present invention relates to using in-band signaling to facilitate modem on hold.

2. Background

The widespread use of the Internet as a daily research, entertainment, and communication tool has increased the deployment of modems and other communication devices. Many homes and offices use their existing telephone lines to access the Internet via modems. The existing lines, however, may support some subscriber-selected features, such as a call-waiting feature, which may interrupt a modem connection. Other similar interruptions may occur while using modems or other communication systems.

Recently, various modem-on-hold schemes have been suggested to remedy such interruptions. For example, when a call-waiting interrupts a communication session established between a local modem and remote modem, the local modem receiving the call-waiting interruption may request an on-hold period from the remote modem, so that the call waiting may be answered. In order to act upon or respond to a call waiting event, local modem may need to communicate with its data terminal equipment ("DTE"), such as a host software running on a personal computer or data circuit equipment ("DCE"). Typically, such communications between the DTE and the DCE are achieved using various predetermined command sets, such as the well-known AT commands. For the local modem or the DCE to accept commands from the DTE, conventionally, the local modem must be placed in command mode, so that the DCE does not transmit the data received from the DTE to the remote modem, but treat such data as commands.

One conventional scheme to cause the local modem to escape to command mode is through use of an escape sequence that can be detected by the local modem during data transfer. One such escape sequence includes transmission of three predetermined characters, such as "+++", from the DTE to the local modem, provided that no data is transmitted from the DTE to the local modem for one second prior to transmission of the three characters, that the three characters are transmitted within a one-second period, and that no more data is transmitted after the last character for a one-second period. If all such criteria are detected and confirmed by the local modem to have been met, the local modem responds with an "OK" message indicating to the DTE that the local modem can accept commands from the DTE. However, while in command mode, either the data being received from the remote modem will be discarded or the local modem will utilize flow control to request the remote modem to cease data transmission while the local modem is in command mode. Once the DTE is ready to exit command mode and return to data mode, the DTE may issue a command known as ATO to request the local modem to return to data mode.

Such schemes, however, introduce many drawbacks when used in conjunction to place modem communications on hold. One drawback is that the local modem is not permitted to switch out of data mode unless requested by the DTE; therefore, the local modem can only inform the DTE of a call waiting event through hardware means, for example by a hardware signal. Further, even after the local modem informs the DTE of the call waiting event through hardware means, the DTE must at that point transmit the escape sequence to enter command mode if the DTE wishes to interrogate the local modem for caller ID information and alike. However, as explained above, not only the escape sequence could take more than three seconds to be transmitted and detected, even yet, once the local modem escapes to command mode, data communication with the remote modem is interrupted. As a result, the user must face data interruption even though the user may not be interested in answering the call waiting.

Accordingly, there is an intense need in the art for systems and method that can communicate a modem-on-hold event to the DTE more efficiently and without interruption of the data flow between the local modem and the remote modem. Furthermore, there is a need in the art for systems and methods that can provide a user-transparent modem-on-hold communications between the local modem and the DTE.

SUMMARY OF THE INVENTION

In accordance with the purpose of the present invention as broadly described herein, there is provided methods and systems for facilitating modem-on-hold communications between the DTE and the DCE, which utilize in-band commands and status messages. As a result of utilizing in-band commands and status messages to communicate a modem-on-hold event to the DTE, the modem-on-hold process is performed more efficiently and without interruption of the data flow between the local modem and the remote modem. In addition, the present invention provides a user-transparent modem-on-hold communications between the DCE and the DTE.

In one aspect, communication method and system of the present invention is used by a local modem (or DCE) and a host (or DTE), while the local modem is in communication with a remote modem through a central office. In operation, the local modem receives an alert signal, such as a call waiting signal, from the central office indicating an incoming call. In response, the local modem acknowledges the alter signal by sending a tone to the central office. Next, the local modem notifies the remote modem of a modem-on-hold state. Furthermore, the local modem collects caller identification received from the central office and informs the host of the call waiting event. Next, the local modem may receive an in-band caller identification request from the host requesting the caller identification. The in-band caller identification request may be in the form of an AT command embedded in a data stream transmitted by the host and received by the local modem. In response, the local modem transmits the caller identification to the host using an in-band caller identification message, i.e. caller identification information is embedded in a stream of data transmitted by the local modem to the host. In one aspect, the local modem receives an in-band answer request from the host to answer said incoming call.

In a further aspect of the present invention, the local modem may receive a hold acknowledgement, including a hold time from the remote modem in response to the notification sent by the local modem. Further, the host may transmit an in-band hold time request to the local modem requesting the hold time and, in response, the local modem transmits the hold time to the host using an in-band hold time message. In another aspect, the local modem may inform the host of the alert signal by toggling a host interface signal, such as a ring signal, or the local modem may transmit an in-band ring message to inform the host of the alert signal.

These and other aspects of the present invention will become apparent with further reference to the drawings and specification, which follow.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present invention may be described herein in terms of functional block components and various processing steps. It should be appreciated that such functional blocks may be realized by any number of hardware components and/or software components configured to perform the specified functions. For example, the present invention may employ various integrated circuit components, e.g., memory elements, digital signal processing elements, logic elements, look-up tables, tone generation elements, voice synthesizer elements, and the like, which may carry out a variety of functions under the control of one or more microprocessors or other control devices. In addition, those skilled in the art will appreciate that the present invention may be practiced in any number of data communication contexts and that the modem system described herein is merely one illustrative application for the invention. Further, it should be noted that the present invention may employ any number of conventional techniques for data transmission, signaling, signal processing and conditioning, tone generation and detection and the like. Such general techniques that may be known to those skilled in the art are not described in detail herein.

It should be appreciated that the particular implementations shown and described herein are merely exemplary and are not intended to limit the scope of the present invention in any way. Indeed, for the sake of brevity, conventional encoding and decoding, caller ID detection or processing, tone detection or transmission, training, and other functional aspects of the data communication system (and components of the individual operating components of the system) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

It should be noted that the present invention may be practiced in conjunction with any, or a combination, of the embodiments of the inventions disclosed in the following related applications. Application Ser. No. 09/644,806, filed Aug. 23, 2000 and entitled "Communication On Hold Notifier", application Ser. No. 09/592,707, filed Jun. 13, 2000 and entitled "Communication On Hold", which claims the benefit of a provisional application Ser. No. 60/167,572, filed Nov. 26, 1999, and which "Communication On Hold" application is also a Continuation-In-Part of U.S. application Ser. No. 09/557,233, filed Apr. 24, 2000 and entitled "Quick Connect Parameter Exchange," which is a Continuation-In-Part of U.S. application Ser. No. 09/416,482, filed Oct. 12, 1999 and entitled "Signaling Mechanism for Modem Connection Holding and Reconnecting," which applications are hereby fully incorporated by reference in the present application.

Figure 1:
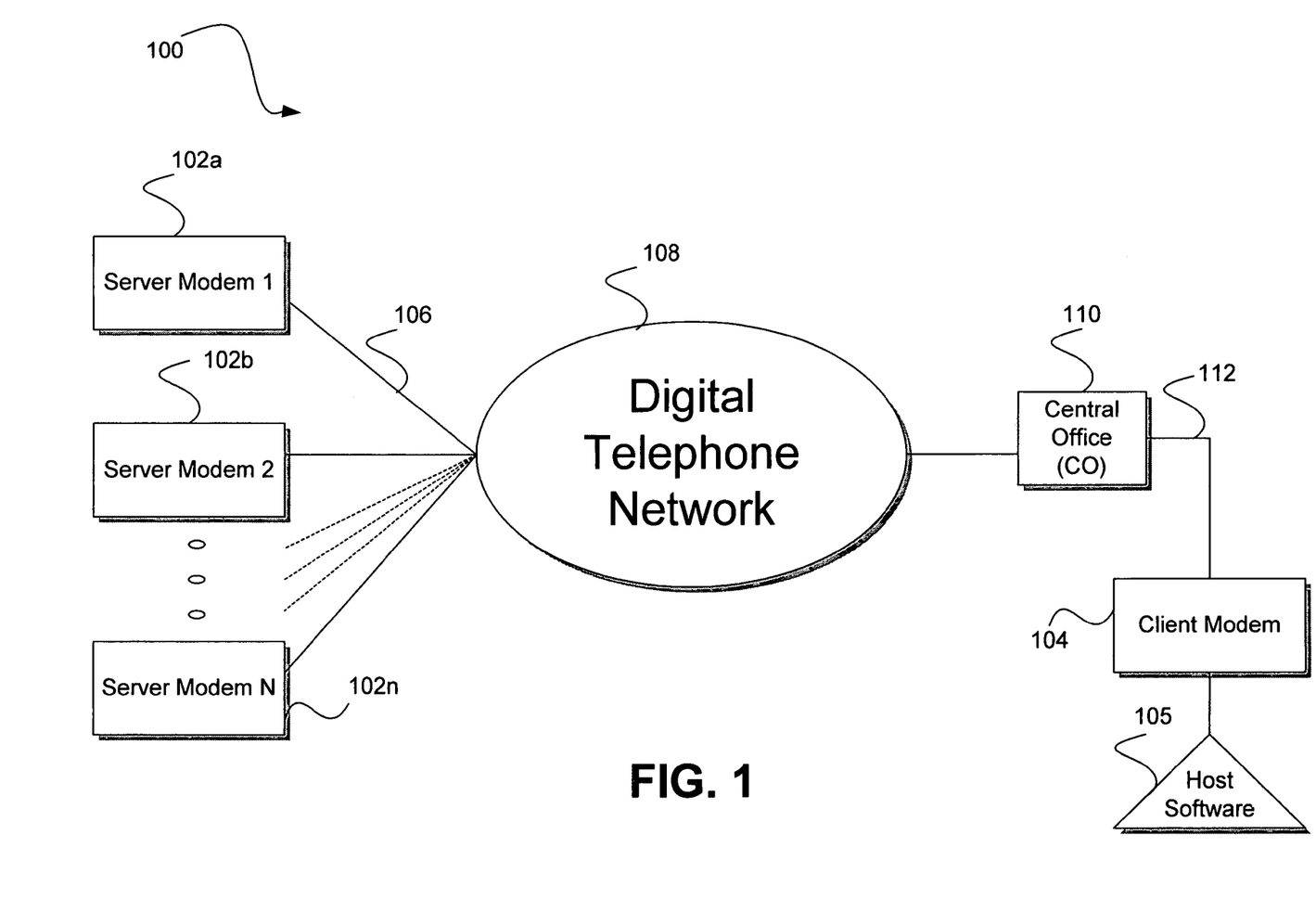
FIG. 1 is a block diagram depicting a general modem system environment capable of supporting point-to-point protocol ("PPP") connections.

Turning to the drawings, FIG. 1 illustrates a block diagram depicting a general modem system 100 in which the techniques of the present invention may be practiced. Modem system 100 may be capable of supporting connections associated with an upper layer protocol, e.g., point-to-point protocol ("PPP") connections. PPP connections are typically associated with Internet communications between, e.g., an individual end user and an Internet service provider. In this respect, modem system 100 includes a plurality of server modems (identified by reference numbers 102a, 102b, and 102n) and a client modem 104. Server modems 102 may each be associated with an Internet service provider or any suitable data source. Client modem 104 may be associated with a suitable data source, e.g., a personal computer capable of running host software 105. For purposes of this description, host software 105 may be any application and/or driver running on an operating system such as MICROSOFT WINDOWS, or any application program capable of functioning in conjunction with modem system 100. Although not shown in FIG. 1, client modem 104 may be integrated with the personal computer.

In the context of this description, modem system 100 may employ 56 kbps modem devices that are compatible with the V.92 Recommendation, the V.90 Recommendation, legacy 56 kbps protocols, the V.34 Recommendation, or the like. Such modem devices are suitable for use in the modem system 100 where a given server modem 102 utilizes a digital connection 106 to the digital telephone network 108. The client modem 104 is connected to a local central office 110 via an analog local loop 112. Thus, the communication channel established between client modem 104 and any server modem 102 is digital up to the central office 110. Thereafter, the digital signals are converted to an analog signal for transmission over the local loop 112.

If an end user desires to establish an Internet connection, host software 105 may perform any number of operations in response to a user command. For example, host software 105 may prompt client modem 104 to dial the telephone number associated with server modem 102a (which, for this example, is the server modem associated with the user's Internet service provider). Server modem 102a and client modem 104 perform a handshaking routine that initializes the equalizers, echo cancelers, transmit power levels, data rate, and possibly other operational parameters associated with the current communication channel.

Traditionally, client modem 104 may be referred to as the DCE and host software 105 running on a computer may be referred to as the DTE. Client modem 104 and host software 105 are capable of communicating using in-band command and control sequences. An in-band command sequence is a two or multiple character sequence, including a data link escape character followed by a command character. For example, the data link escape character may be <EM> or 19h (hexadecimal). The command sequence may be an extended command or a short command. For the extended command, the command character is followed by additional characters as defined in the command definition. In one embodiment, except for the escape character, all short or extended command character are limited to the range of 20h to 7Eh and A0h to FEh. Further, in-band control sequence is a logical V.24 circuit defined between DTE and DCE, but which is presented by one device to the other by means of in-band sequence instead of or in addition to physical circuits. ITU-T Recommendation V.80, entitled "In-Band DCE Control and Synchronous Data Modes for Asynchronous DTE", dated August 1996, describes in-band command and control sequences in detail and is hereby incorporated by reference.

Figure 2:
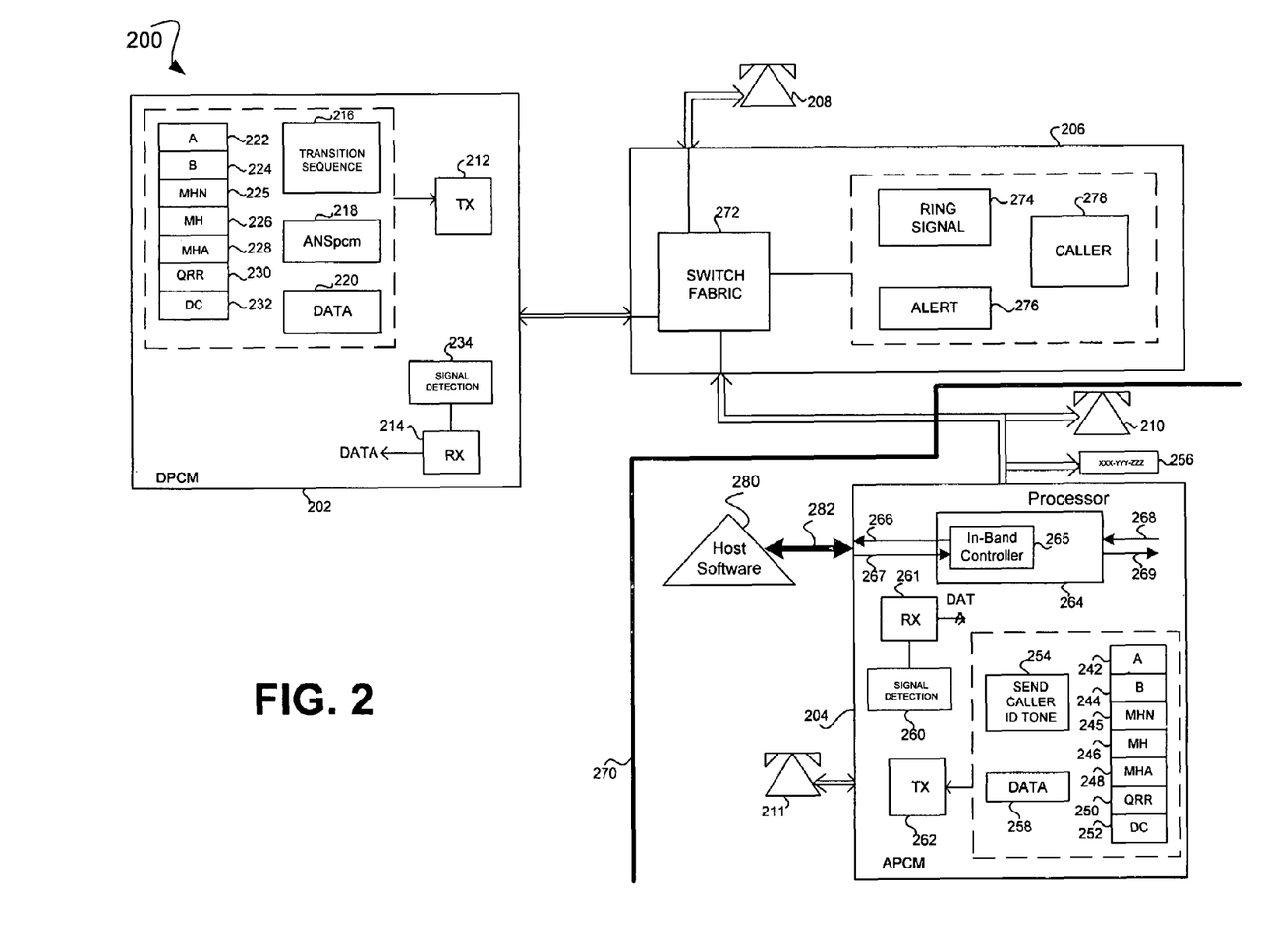
FIG. 2 is a block diagram of a modem system environment in which various aspects of the present invention may be incorporated.

FIG. 2 is a schematic representation of an exemplary environment in which a modem system 200 may operate. Modem system 200 generally includes a first modem device 202, which may be associated with a central site, and a second modem device 204, which may be resident at a customer site 270. In the context of a typical V.92 or V.90 system, first modem device 202 may be the DPCM and second modem device 204 may be the APCM. However, for purposes of the present invention, the first and second modems may be any communication device or any type of modem. In other words, the use of APCM and DPCM modems throughout the present application is merely exemplary.

As shown, the DPCM modem 202 is coupled to a central office 206 via a digital link and the APCM modem 204 is coupled to central office 206 via an analog link, e.g., the local loop. It should be appreciated that modem system 200 may include additional elements and functionality associated with the quick startup routine and/or the quick reconnect procedure described in the above-incorporated related applications.

FIG. 2 also depicts a calling device 208 (which is capable of placing an incoming call to the customer site), a parallel answer device 210 located at the customer site, and a series answer device 211 located at the customer site. As shown in FIG. 2, the parallel answer device 210 is connected such that it receives the same calls as the APCM modem 204 in a concurrent manner. In contrast, the series answer device 211 is connected such that the APCM modem 204 routes calls to it. The APCM modem 204 may control or regulate the call traffic to and from series answer device 211 in a conventional manner. A call may be established between the calling device 208 and the answer devices 210 and 211 via the central office 206, and a modem connection may be established between the DPCM modem 202 and the APCM modem 204 via the central office 206.

For the sake of clarity and brevity, FIG. 2 depicts the APCM modem 204 and the DPCM modem 202 in a manner that relates to the example processes described herein. In practical embodiments, each of the modem devices 202 or 204 may be capable of functioning as a transmit or receive modem, and each of the modem devices 202 or 204 may be capable of originating the various signals described herein.

The DPCM modem 202 includes a transmitter section 212 and a receiver section 214, both of which may be configured in accordance with conventional technologies. The DPCM modem 202 is capable of transmitting a number of signals, sequences and tones during various modes of operation. The DPCM modem 202 may be configured to transmit a suitable transition sequence 216 and a characteristic signal point sequence (such as the ANSpcm signal 218) associated with a quick startup routine or a quick reconnect procedure, as described in the above-incorporated related applications. During the data mode, the DPCM modem 202 transmits data 220 in accordance with a suitable data transmission scheme.

The DPCM modem 202 is also capable of transmitting a number of signals that may be received by the APCM modem 204 and/or by the central office 206. For example, the DPCM modem 202 is capable of transmitting an "A" tone 222 and a "B" tone 224 as described herein. In one embodiment, the "A" tone 222 is a 2400 Hz tone and the "B" tone 224 is a 1200 Hz tone (as set forth in ITU-T Recommendation V.34). Of course, the modem devices 202 or 204 may generate and process any suitable tones or signals in lieu of (or in addition to) these predefined tones. The DPCM modem 202 is also configured to transmit a number of additional signals associated with the notification of a modem-on-hold, the initiating of a modem-on-hold mode, the reconnection of a modem session after a holding period, and the clearing down of a modem connection, as further described below. For example, the DPCM modem 202 may be capable of transmitting a modem hold notification 225, a modem hold request 226, a modem hold acknowledgment 228, a quick reconnect request 230 and a disconnect signal 232 (referred to herein as "modem status signals"). The format and function of these signals are described in more detail below.

The DPCM modem 202 may also include a signal detection element 234, which may employ any number of known techniques to detect, analyze, and interpret control signals, requests, and tones transmitted by the APCM modem 204 and/or by the central office 206. For example, signal detection element 234 may utilize a conventional tone detector and/or a conventional V.34, V.90 or V.92 differential phase-shift keying (DPSK) receiver configured to detect and distinguish the different signals described herein.

For purposes of the signaling scheme described herein, the APCM modem 204 is preferably configured in a manner similar to the DPCM modem 202. In other words, the APCM modem 204 is capable of transmitting an "A" tone 242, a "B" tone 244, a modem hold notification 245, a modem hold request 246, a modem hold acknowledgment 248, a quick reconnect request 250 and a disconnect signal 252. In addition, the APCM modem 204 may be configured to generate a send caller ID tone 254 that informs central office 206 that the customer site supports receiving the caller ID feature (as depicted by the caller ID component 256). In accordance with current standards, the send caller ID tone 254 is a DTMF "D" tone having a length of approximately 55–65 milliseconds. Of course, the APCM modem 204 transmits data 258 during the data mode.

As described above in connection with the DPCM modem 202, the APCM modem 204 preferably includes a signaling detection element 260 that enables APCM 204 to receive, detect, and analyze the various signaling tones and sequences transmitted by the DPCM modem 202. In this manner, both the APCM modem 204 and the DPCM modem 202 are capable of receiving the signals and are capable of switching operating modes in response to the particular signal or signals that are received.

The central office 206 is configured in a conventional manner to perform circuit switching associated with modem, voice, and facsimile calls. The central office 206 may support any number of customer sites and the central office 206 may be operatively coupled to any number of other central offices, central site modems, or the like. As described briefly above, the APCM modem 204, answer device 210, and caller ID component 256 may reside at customer site 270.

The central office 206 includes a suitable switching fabric 272 for routing calls between the appropriate parties. For example, the switching fabric 272 may switch to a first state to establish a modem connection between the DPCM modem 202 and the APCM modem 204 and to a second state to establish a voice connection between calling device 208 and answer device 210. Furthermore, switch fabric 272 may be capable of temporarily interrupting a connection to impress control signals, data, or tones onto the current circuit or line. In this respect, central office 206 may transmit a number of ring signals 274, alert signals 276, caller ID data 278, and other information depending upon the particular situation. For example, in accordance with current methodologies, central office 206 may temporarily interrupt a voice call and transmit a call-waiting alert signal 276 to the customer site 270. If the customer accepts the incoming call, then switch fabric 272 may be reconfigured to route the incoming call the customer site 270 while the original call is placed on hold.

As shown, APCM modem 204, i.e. DCE, is in communication with host software 280, i.e. DTE, via communication line 282. APCM modem 204 has the ability to recognize and accept command and control sequences from host software 280 and generate status messages to host software 280, which sequences and messages are embedded in user data delivered to host software 280. Similarly, host software 280 has the ability to recognize and accept command and control sequences from APCM modem 204 and generate status messages to APCM modem 204, which sequences and messages are embedded in user data delivered from DPCM modem 202 to APCM modem 204. In one embodiment, host software 280 and APCM modem 204 are capable of supporting the ITU-T V.80 Recommendation in-band command and control sequences.

As shown in FIG. 2, APCM modem 204 includes processor 264, including in-band controller 265, in communication with host software 280 via host receiver 267 and host transmitter 266. Further, processor is capable of receiving data from APCM receiver 261 via modem receiver 268 and transmitting data to APCM transmitter 262 via modem transmitter 269. In one embodiment, APCM modem operates under the control of processor 264. In some embodiments, processor 264 may be the host processor of a personal computer. Processor 264 is capable of performing modem-on-hold algorithm, process and respond to in-band commands via in-band controller 265.

In one embodiment, the character set used to build valid in-band commands is a set of 7-bit (20h to 7Eh) or 8-bit (A0h to FEh) characters. When 8-bit characters are used, additional command characters are potentially available. The escape character for in-band commands may be the <EM> character, which has a hexadecimal value of 19h. In the 8-bit character set, the $8^{th}$ bit may be zero or one and is ignored; therefore, the escape character may have the value of 19h or 99h.

As set forth in the V.80 Recommendation, basic in-band commands consist of <EM> followed by a single valid command character. For example, an extended in-band command consists of: (1)<EM>, (2) a valid command character defined as an extended command, (3) a valid length byte, and (4) 1 to 95 additional valid characters, specified by the length byte. The length value ranges from 20h to 7Eh, offset by 1Fh. Further, if enabled by host software 280, APCM modem 204 can report the state of selected V.24 circuits and other status states to host software 280 by delivering status messages embedded in the data stream transmitted from APCM modem 204 to host software 280 on communication line 282. For example, using in-band control command, host software 280 may wish to issue the command string "AT+IBC=,,,,,,1" to request APCM 204 to provide status messages to host software 280 when data carrier signal (DCD) makes a transition. According to the V.80 Recommendation, an in-band command may be sent as "<EM> <extend-0> <length> <control> <AT command without AT and trailing carriage return>" or "<19h> <40h> <2Ch> <42h>+IBC=,,,,,,1". Accordingly, whenever DCD makes a transition from off to on, host software 280 sends the message <EM> <109on> or "<19h> <67h>" to APCM modem 204.

Figure 3:
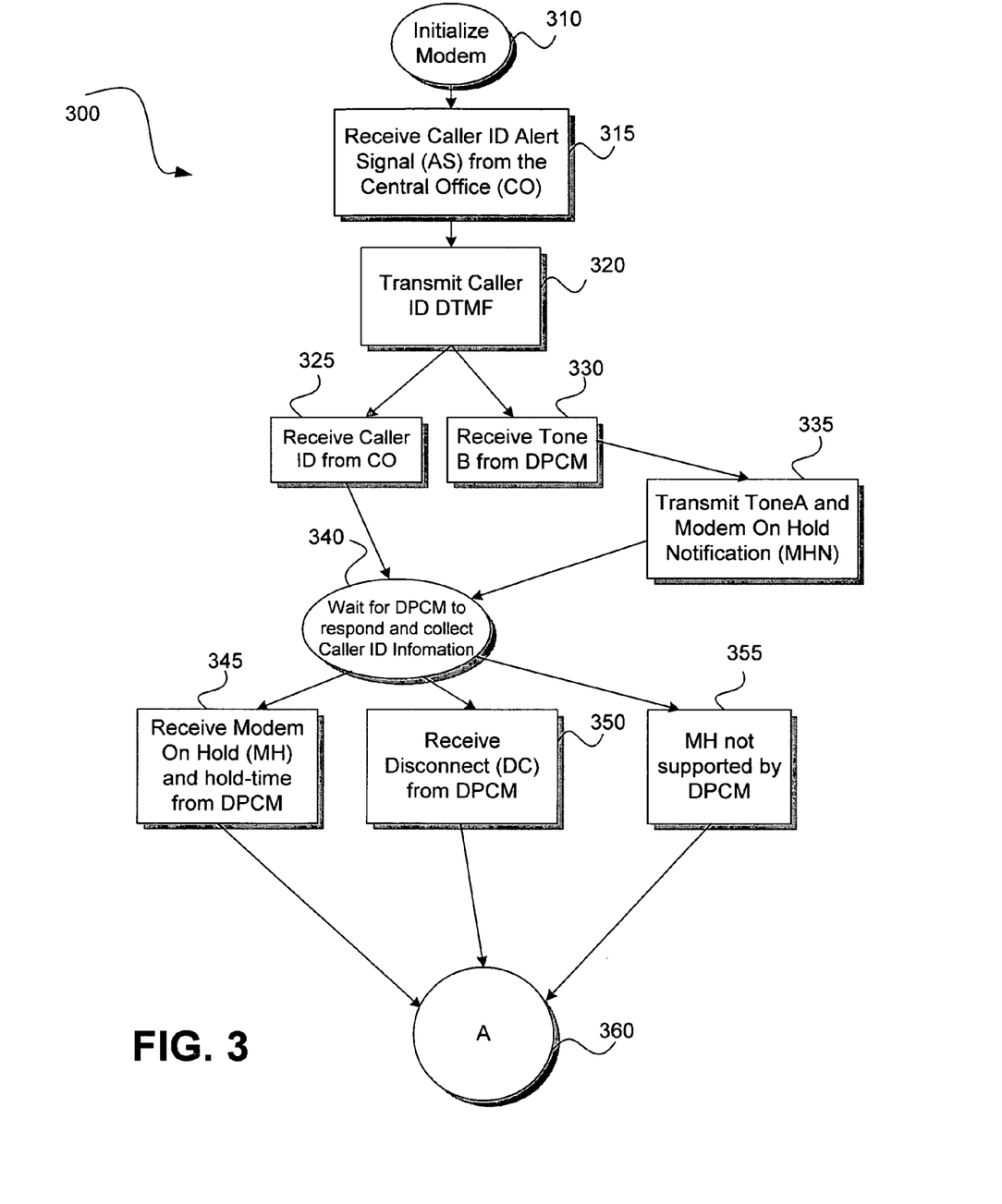
FIG. 3 is a flow diagram illustrating a modem-on-hold transaction using an exemplary in-band signaling of the present invention.

FIG. 3 is a flow diagram illustrating a modem-on-hold transaction using an exemplary in-band signaling of the present invention. As shown, in-band signaling process 300 starts by initializing the modem, for example, APCM modem 204 of FIG. 2. In step 310, host software 280 may initialize APCM modem 204 by sending various control commands. The initialization commands may be sent to APCM modem 204 before or after APCM modem 204 and DPCM modem 202 establish a connection. The initialization command may include commands to enable modem-on-hold feature of APCM modem 204. Such initialization commands will require APCM modem 204 to inform host software 280 when a call waiting event occurs. In one embodiment, host software 280 may transmit an in-band command sequence for AT+IBC=1,,,,,,1 to request APCM modem 204 to transmit a status message when a call waiting event is detected. For example, the initialization commands may include an in-band command sequence "<19h> <40h> <2Eh> <42h>+IBC=1,,,,,,1". Accordingly, whenever the call waiting tone is detected, host software 280 sends the message <EM> <125on> or "<19h> <6Bh>" to APCM modem 204 and when the call waiting tone disappears, host software 280 sends the message <EM> <125off> or "<19h> <6Ah>" to APCM modem 204.

In one embodiment, in addition to or in place of transmitting in-band status messages, APCM modem 204 may cause the physical ring signal be toggled, as defined by the RS232 serial connection standard. Yet, in some embodiments wherein APCM modem 204 communicates with host software 280 via a parallel interface, such as a 16550 parallel interface, APCM modem 204 may toggle a designated bit in a designated register of 16550 parallel interface. The designated bit may be the bit designated for ring detection in the MSR register. By monitoring the in-band messages and/or RS232 signals or 16550 parallel interface, host software 280 shall be able to detect the occurrence of a call waiting event.

As a part of the initialization command string, host software 280 may also transmit in-band command AT+VRID=2 or "<19h> <40h> <27h> <42h>+VRID=2". This command will cause APCM modem 204 to provide caller ID 442 information to host software 280 in terse form when APCM modem 204 is later interrogated by an AT+VRID? command or "<19h> <40h> <26h> <42h>+VRID?".

Figure 4:
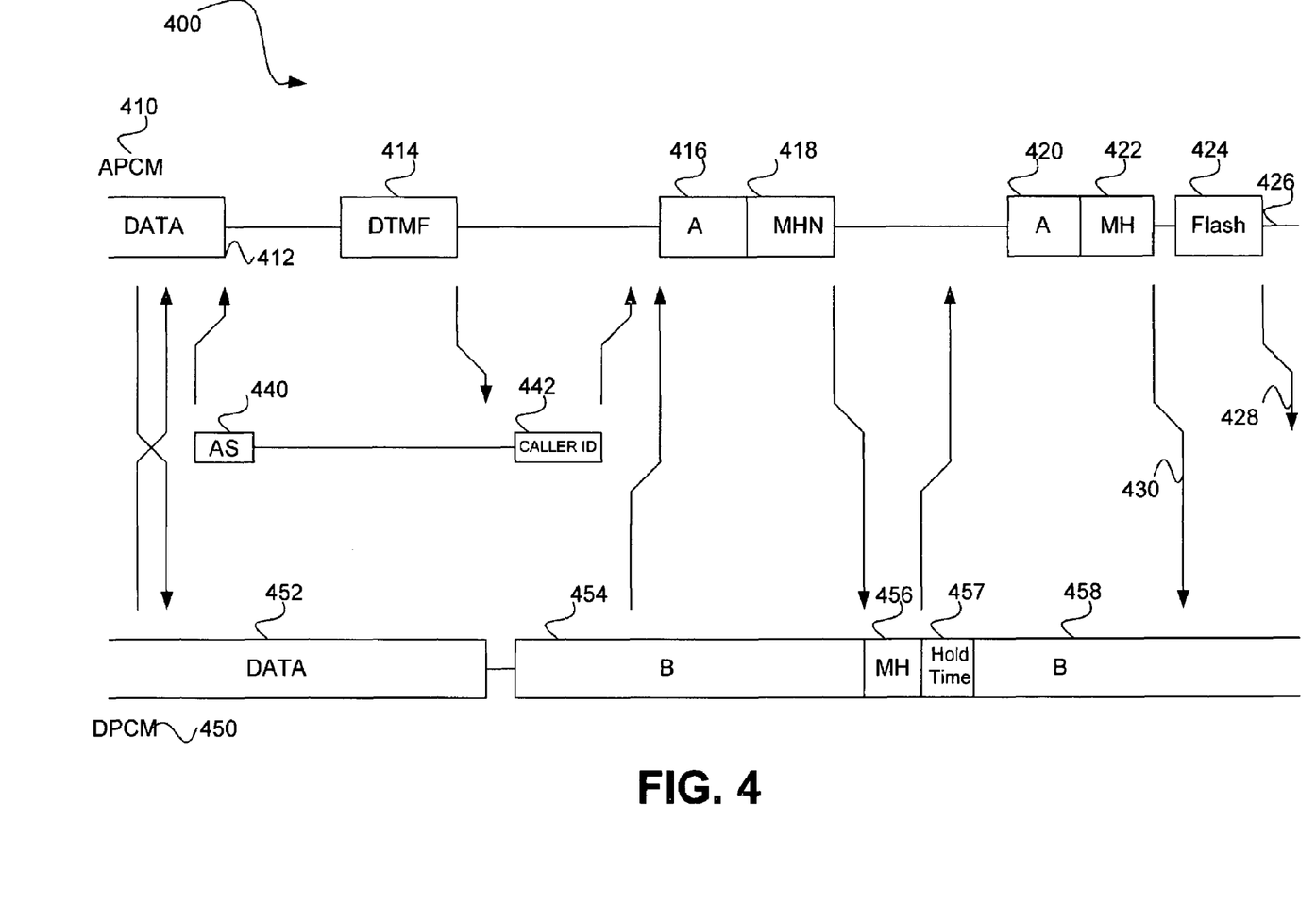
FIG. 4 is a timing diagram illustrating a modem-on-hold transaction.

Referring to FIG. 4, it illustrates a timing diagram of a connection, between APCM modem 410 and DPCM modem 450, that is interrupted by a call-waiting indication. After APCM modem 204 and DPCM modem 202 enter data mode, in step 315, the central office may temporarily interrupt the data connection and send an alert signal ("AS") 440 to APCM modem 410. Alert signal 440 may be a conventional call-waiting alert and it may include a component that is audible to humans (e.g., an audio tone) and a component that is detectable by data communication devices or machines. In accordance with most call-waiting protocols, alert signal 440 components are transmitted in series. In response to alert signal 440, in step 320, APCM modem 410 may send DTMF tone 414 to request caller ID data from the central office. As described above, DTMF tone 414 may be a short burst of a DTMF "D" tone having a duration of about 55–65 milliseconds. Assuming that the central office receives and recognizes DTMF tone 414, the central office will format and transmit caller ID data 442 to the APCM modem 410. In step 325, caller ID data 442 may be received and processed in a suitable manner for display or analysis by APCM modem 204.

In step 330 starts receiving "B" tone 454, which is generated by DPCM modem 450 in response to the switching out of APCM modem 410 by the central office. In one embodiment, "B" tone 454 may be transmitted while caller ID data 442 is being transmitted by the central office. "B" tone 454 is continuously transmitted while DPCM modem 450 waits for APCM modem 410 to reply with "A" tone 416, in step 335.

During the period in which the central office interrupts the communication between APCM modem 410 and DPCM modem 450 by sending alert signal 440 and caller ID data 442 to APCM modem 410, DPCM modem starts receiving a silence. As part of step 335, APCM modem 410 transmits modem hold notification 418 to DPCM modem 450 after transmitting "A" tone 416. "A" tone 416 is preferably transmitted for at least a minimum duration, e.g., 50 milliseconds, to give DPCM modem 450 an opportunity to receive "A" tone 416. If DPCM modem 450 does not receive "A" tone 416 within a specific time period, then DPCM modem 450 may eventually disconnect itself.

At this point, process 300 enters step 340, wherein APCM modem 410 awaits a response from DPCM modem 450 and may continue to receive and collect caller ID 442 information arriving from the central office. Now, once DPCM modem 450 receives modem hold notification 418 from APCM modem 410, in one scenario, DPCM modem 450 transmits modem hold 456 to APCM modem 410, informing APCM modem 410 that DPCM modem 450 is willing to be placed on hold while APCM modem 410 switches to the incoming call. In some embodiments, modem hold 456 may include a hold-time parameter 457 indicating the amount of time DPCM modem 450 may be placed on hold before disconnecting. In other embodiments, the hold period may be negotiated at the initial training or any other time after a communication session has been established between APCM modem 410 and DPCM modem 450. Upon receipt of modem hold 456 notification, process 300 enters step 345. However, in other scenarios, as shown in FIG. 3, DPCM modem 450 may inform APCM modem 410 that DPCM modem 450 will disconnect the connection if APCM modem 410 desires to place the data communication on hold by transmitting modem disconnect. In such event, process 300 enters step 350. Even yet, in another scenario, DPCM modem 450 may not respond to APCM modem 410, in which event process 300 enters step 355 after a time out period.

As shown in FIG. 3, regardless of the type of response from DPCM modem 202 or lack thereof, process 300 moves from steps 345, 350 or 355 to state 360 and from there to step 362. In step 362, according to the initialization of APCM modem 204 during initialization step 310, APCM modem 204 informs host software 280 of the call waiting event by transmitting an in-band status message. In one embodiment, APCM modem 204 informs host software 280 of the call waiting event after caller ID 442 information has been completely received, but in other embodiments, host software 280 may be informed at any time prior to receipt or completion of caller ID 442. APCM modem 204 may transmit the sequence "<EM> <125on>" or "<19h> <6Bh>" to host software 280. Further, when the call waiting tone disappears, APCM modem 204 may transmit the sequence "<EM> <125off>" or "<19h> <6Ah>" to host software 280. As described above, in addition to transmitting an in-band status message, APCM modem 204 may also cause the ring indicate signal of the RS232 interface or the ring indicate bit in the 16550 parallel interface to toggle, as applicable.

At this point, process 300 moves to step 364, wherein host software 280 requests for caller ID 442. However, host software 280 does not interrupt the on-line data mode by escaping to command mode, but host software 280 issues an in-band command to APCM modem 204 to obtain caller ID 442. To this end, host software 280 transmits the embedded command for AT+VRID? or "<19h> <40h> <26h> <42h>+VRID?". In step 366, APCM modem 204 receives the caller ID interrogation command and responds by transmitting the following in-band status message: "<19h> <60h> <length> <62h> <raw caller ID 442 information>". It should be noted that, in step 364, using another in-band command, host software 280 may further inquire about hold time 457 from APCM modem 204. In return, in step 366, APCM will transmit a further in-band status message informing host software 280 of hold time 457. It should also be noted that caller ID 442 and hold time 457 may also be inquired by a single in-band command and responded to by a single status message.

Next, in step 368, APCM modem 204 waits for a response from host software 280 as to whether the call waiting should be answered or ignored. For example, while APCM 204 is awaiting a response from host software 280, host software 280 may inquire from the user by displaying caller ID 442 and hold time 457, whether the user would like to accept the call waiting. If the user decides to answer the call waiting, process 300 moves to step 370 and host software 280 request APCM modem 204 to answer the call by transmitting an in-band command for "ATA", i.e. "<19h> <40h> <21h> <42h> A". However, if the user decides not to answer the call waiting, process 300 will enter step 382, wherein host software requests APCM modem 204 to continue with the ongoing communication with DPCM modem 202 by transmitting an in-band command for "ATO", i.e. "<19h> <40h> <21h> <42h>O".

Assuming that the user of APCM modem 410 desires to answer the incoming call, process 300 enter step 372 and modem hold 422 is transmitted to DPCM modem 450 following "A" tone 420. In one embodiment, in response to modem hold 422, DPCM modem 450 may transmit a modem hold acknowledgment (not shown) for a minimum period of time, e.g., approximately 53 milliseconds. After DPCM modem 450 transmits modem hold 456 (or, alternatively, the hold-time parameter 457 or the modem hold acknowledgment (not shown)), DPCM modem 450 preferably continues to transmit "B" tone 458 while maintaining a hold state. In response to the modem hold acknowledgment (not shown) or after a predetermined period of time, in step 376, APCM modem 410 may generate suitable flash signal 424 to instruct the central office to switch out the modem connection and to switch in the incoming call. At this point, process 300 enters step 378, wherein APCM modem 204 continues monitoring communication line 282 for in-band commands from host software 280. Once the user wishes to terminate the call and switch back to the modem connection, host software 280 may transmit an in-band command, such as "ATO" to APCM modem to return to data mode. In other words, APCM modem 204 will issue an in-band command for "ATO", i.e. "<19h> <40h> <21h> <42h>O". In response, process 300 moves to step 380, wherein APCM modem 410 generates a suitable flash signal to instruct the central office to switch back to the modem connection.

As stated above, if state 360 was entered via step 350, in other words, DPCM modem 202 informed APCM modem 204 that the connection will be terminated if APCM modem 204 decides to place the modem connection on hold, then process 300 moves from state 370 to step 374, wherein APCM modem 204 transmits an "A" tone followed by a disconnect request. Now, if in step 368 above, the user decides to ignore and not to answer the call waiting, APCM modem 204 transmits an "A" tone followed by a quick reconnect request to resume the data communication.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A communication method for use between a local modem and a host while said local modem is in communication with a remote modem through a central office, said method comprising the steps of:
   receiving an alert signal from said central office indicating an incoming call;
   acknowledging said alter signal;
   notifying said remote modem of a modem-on-hold state;
   collecting caller identification received from said central office;
   informing said host of said alert signal;
   receiving an in-band caller identification request from said host for said caller identification;
   transmitting said caller identification to said host using an in-band caller identification message; and
   receiving an in-band answer request from said host to answer said incoming call;
   wherein said in-band caller identification request, said in-band caller identification message and said in-band answer request are embedded in a data stream being communicated between said local modem and said host.

2. The method of claim 1 further comprising the step of receiving a hold acknowledgement from said remote modem in response to said notifying step.

3. The method of claim 2, wherein said hold acknowledgment includes a hold time, and wherein said method further comprising the steps:
   receiving an in-band hold time request from said host; and
   transmitting said hold time to said host using an in-band hold time message;
   wherein said in-band hold time request and said in-band hold time message are embedded in said data stream being communicated between said local modem and said host.

4. The method of claim 1 further comprising the step of requesting said remote modem to enter said modem-on-hold state.

5. The method of claim 1, wherein said step of informing uses an RS232 ring signal or a 16550 ring signal to inform said host of said alert signal.

6. The method of claim 1, wherein said step of informing uses an in-band ring message to inform said host of said alert signal, wherein said in-band ring message is embedded in said data stream being communicated between said local modem and said host.

7. The method of claim 1 further comprising the steps of:
   receiving a disconnect reply from said remote modem in response to said notifying step; and
   transmitting a disconnect request to said remote modem after said host informs said local modem of its desire to answer said incoming call.

8. A local modem in communication with a host, said local modem further in communication with a remote modem through a central office, said local modem comprising:
   an alert signal detector capable of detecting an alter signal from said central office indicating an incoming call;
   a processor controlling a host receiver, a host transmitter, a modem receiver and a modem transmitter, said processor having an in-band controller;
   wherein said processor acknowledges said alter signal, said modem transmitter notifies said remote modem of a modem-on-hold state, said processor collects caller identification received by said modem receiver from said central office, said processor informs said host of said alert signal, said in-band controller receives an in-band caller identification request via said host receiver from said host, said in-band controller transmits said caller identification to said host using an in-band caller identification message via said host transmitter, and said in-band controller receives an in-band answer request via said host receiver from said host to answer said incoming call;
   wherein said in-band caller identification request, said in-band caller identification message and said in-band answer request are embedded in a data stream being communicated between said local modem and said host.

9. The local modem of claim 8, wherein said processor receives a hold acknowledgement via said modem receiver from said remote modem in response to said modem-on-hold state notification.

10. The local modem of claim 9, wherein said hold acknowledgment includes a hold time, and wherein said in-band controller receives an in-band hold time request via said host receiver from said host, and said in-band controller transmits said hold time to said host using an in-band hold time message via said host transmitter, wherein said in-band hold time request and said in-band hold time message are embedded in said data stream being communicated between said local modem and said host.

11. The local modem of claim 8, wherein said processor requests said remote modem to enter said modem-on-hold state.

12. The local modem of claim 8, wherein said processor uses an RS232 ring signal or a 16550 ring signal to inform said host of said alert signal.

13. The local modem of claim 8, wherein said processor uses an in-band ring message to inform said host of said alert signal, wherein said in-band ring message is embedded in said data stream being communicated between said local modem and said host.

14. A computer readable medium including a computer program product executable by a processor in a local modem, said local modem being in communication with a host and in communication with a remote modem through a central office, said computer program product comprising:
   code for receiving an alert signal from said central office indicating an incoming call;
   code for acknowledging said alter signal;

code for notifying said remote modem of a modem-on-hold state;

code for collecting caller identification received from said central office;

code for informing said host of said alert signal;

code for receiving an in-band caller identification request from said host for said caller identification;

code for transmitting said caller identification to said host using an in-band caller identification message; and code for receiving an in-band answer request from said host to answer said incoming call;

wherein said in-band caller identification request, said in-band caller identification message and said in-band answer request are embedded in a data stream being communicated between said local modem and said host.

15. The computer program product of claim 14 further comprising code for receiving a hold acknowledgement from said remote modem in response to said notifying said remote modem.

16. The computer program product of claim 15, wherein said hold acknowledgment includes a hold time, and wherein said computer program product further comprising:

code for receiving an in-band hold time request from said host; and code for transmitting said hold time to said host using an in-band hold time message;

wherein said in-band hold time request and said in-band hold time message are embedded in said data stream being communicated between said local modem and said host.

17. The computer program product of claim 14 further comprising code for requesting said remote modem to enter said modem-on-hold state.

18. The computer program product of claim 14, wherein said code for informing uses an RS232 ring signal or a 16550 ring signal to inform said host of said alert signal.

19. The computer program product of claim 14, wherein said code for informing uses an in-band ring message to inform said host of said alert signal, wherein said in-band ring message is embedded in said data stream being communicated between said local modem and said host.

20. The computer program product of claim 14 further comprising:

code for receiving a disconnect reply from said remote modem in response to said notifying said remote modem; and code for transmitting a disconnect request to said remote modem after said host informs said local modem of its desire to answer said incoming call.

* * * * *